(12) United States Patent
Horton

(10) Patent No.: US 12,351,091 B1
(45) Date of Patent: Jul. 8, 2025

(54) CAR MULTI BEVERAGE TRANSPORTING DEVICE

(71) Applicant: Jonathan Horton, Holly Hill, FL (US)

(72) Inventor: Jonathan Horton, Holly Hill, FL (US)

( * ) Notice: Subject to any disclaimer, the term of this patent is extended or adjusted under 35 U.S.C. 154(b) by 92 days.

(21) Appl. No.: 18/390,508

(22) Filed: Dec. 20, 2023

(51) Int. Cl.
*B60R 7/04* (2006.01)
*B60N 3/10* (2006.01)
*B60R 11/00* (2006.01)
*B60N 3/00* (2006.01)
*B65D 1/34* (2006.01)

(52) U.S. Cl.
CPC ........... *B60N 3/103* (2013.01); *B60N 3/102* (2013.01); *B60N 3/002* (2013.01); *B60R 7/043* (2013.01); *B65D 1/34* (2013.01)

(58) Field of Classification Search
CPC ........ B60N 3/002; B60N 3/102; B60N 3/103; B60R 7/043; B60R 7/04; B60R 7/08; B60R 11/00; B60R 22/00; B60R 2011/0012; B60R 2011/0059; B65D 1/34; B65D 25/00; B65D 71/48; B65D 71/0003; Y10S 224/926
USPC ....................................... 108/43, 44; 220/737
See application file for complete search history.

(56) References Cited

U.S. PATENT DOCUMENTS

| | | | | |
|---|---|---|---|---|
| 2,460,530 A * | 2/1949 | Petyak | ............... | B65D 71/0077 206/199 |
| 2,510,591 A * | 6/1950 | Listman | ............. | B65D 71/0003 211/74 |
| 4,942,990 A * | 7/1990 | White | ....................... | B60R 7/04 224/403 |
| 5,102,080 A * | 4/1992 | Altieri, Jr. | .............. | B60N 3/103 248/174 |
| 5,337,984 A * | 8/1994 | Houck | ................... | B60N 3/103 224/281 |
| 5,551,616 A * | 9/1996 | Stitt | ........................ | B60R 7/043 224/539 |
| 5,687,893 A * | 11/1997 | Jacobsmeyer, Jr. | ...... | B60R 7/043 211/195 |
| 6,386,559 B1 * | 5/2002 | Souza | ..................... | B62B 1/264 280/79.5 |
| 6,422,440 B1 * | 7/2002 | Stone | ...................... | B60R 7/043 D12/426 |
| 6,932,214 B1 * | 8/2005 | Zimet | ..................... | B60R 7/043 206/217 |
| 7,604,211 B2 * | 10/2009 | Moore | ................... | B65D 71/50 248/346.03 |
| 9,321,404 B1 * | 4/2016 | Mellenthin | ............. | B60R 22/00 |

(Continued)

*Primary Examiner* — Gideon R Weinerth

(57) ABSTRACT

A multi beverage transporting device suitable for use in holding and transporting a plurality of beverages in a car to minimize spilling is presented. The device includes a multi beverage holding tray, wherein the multi beverage holding tray includes a plurality of beverage holder interfaces on a top surface of the multi beverage holding tray. The device also includes a plurality of beverage holders configured to connect with the multi beverage holding tray and designed to hold a plurality of beverages when connected to the multi beverage holding tray with the plurality of beverage holder interfaces on the top surface of the multi beverage holding tray. The device further includes a transporting handle device configured to connect with the multi beverage holding tray arranged to be connected to the holding tray to allow transporting of the transporting device and structured to engage with a standard car seat belt.

13 Claims, 10 Drawing Sheets

(56) References Cited

U.S. PATENT DOCUMENTS

| | | | | |
|---|---|---|---|---|
| 9,849,838 | B1* | 12/2017 | Siciliano | B60R 11/00 |
| 11,490,768 | B1* | 11/2022 | Ippolito | B60N 3/103 |
| 11,932,205 | B1* | 3/2024 | Rohaly, Jr. | B60N 3/002 |
| 12,263,992 | B1* | 4/2025 | Eggler | B65D 25/102 |
| 2005/0045496 | A1* | 3/2005 | Jenkins | B65D 5/42 |
| | | | | 206/45.25 |
| 2008/0067205 | A1* | 3/2008 | Semendoff | B60R 7/043 |
| | | | | 224/275 |
| 2009/0078713 | A1* | 3/2009 | Quick | B65D 33/14 |
| | | | | 220/694 |
| 2011/0278334 | A1* | 11/2011 | Aadahl | B60R 7/043 |
| | | | | 224/275 |
| 2012/0006871 | A1* | 1/2012 | Strohecker | B60N 3/002 |
| | | | | 224/275 |
| 2012/0118902 | A1* | 5/2012 | Beltrante | B65D 11/08 |
| | | | | 220/737 |
| 2015/0183381 | A1* | 7/2015 | Earley | B60R 11/0252 |
| | | | | 224/275 |
| 2015/0197175 | A1* | 7/2015 | Liebowitz | B60N 3/103 |
| | | | | 224/275 |
| 2016/0213183 | A1* | 7/2016 | Song | A47J 47/14 |
| 2017/0008439 | A1* | 1/2017 | DiFiore | B60R 11/00 |
| 2018/0009356 | A1* | 1/2018 | Liebowitz | B60N 3/002 |
| 2020/0346584 | A1* | 11/2020 | Taylor | B60N 3/107 |
| 2021/0316650 | A1* | 10/2021 | Ruvalcaba | B60R 7/043 |
| 2022/0112027 | A1* | 4/2022 | Melton | B64D 11/003 |
| 2023/0116298 | A1* | 4/2023 | Florea | A01K 1/0103 |
| | | | | 224/543 |
| 2023/0146567 | A1* | 5/2023 | Green | F16M 13/02 |
| | | | | 224/400 |
| 2024/0278958 | A1* | 8/2024 | Ronk | B65D 1/34 |

* cited by examiner

CAR MULTI BEVERAGE TRANSPORTING DEVICE

FIELD OF THE INVENTION

The present invention relates generally to beverage transporting devices, and more particularly, to car multi beverage transporting devices which provide a user the ability to economically and efficiently transport multiple beverages in a car while minimizing beverage spilling.

BACKGROUND OF THE INVENTION

Many devices and systems have been used in unsuccessful attempts to transport multiple beverages while traveling in a car. These systems and devices have not been reliable or effective. Many of the unsuccessful systems are cumbersome, costly and fail to provide a universal common device to transport multiple beverages in a car while minimizing spilling of the beverages.

As the industrial sprawl continues, many families opt to go out to retrieve meals and drinks for their families and to bring them back home. Quite often, the establishments that provide food and drink for take out provide carton or disposable container for use in carrying multiple drinks. These containers are usually flimsy, made of carton or cardboard, and significantly weaken when they absorb moisture, such as when a beverage spills from a container. This makes transporting multiple beverages unwieldly because the inability to maintain their structural integrity leads to spilling drinks and fouling interiors of the cars that are being used to transport the beverages.

Quite often, patrons attempt to double up on the containers, place the beverages in multiple bags, and attempt to amass enough items so that they are bulky in total so that movement of the aggregate beverages and food items are minimized. These solutions can be expensive, time consuming, and result in cumbersome transportation evolutions for those carrying multiple beverages.

Additionally, past attempts have failed to provide a singular device for a user to use in any environment to effectively transport multiple beverages in a car while not spilling. Previous efforts included containers designed to be placed loosely on a floorboard of a car or the passenger seat. Both of these conditions led to beverages spilling when a car would take a turn or go over a bump. Any type of disruption in the smoothness of the car ride results in beverages spilling from their container, fouling the container holder, spilling on the carpet of the car interior, and damaging the seat surfaces of the car, most often the passenger side of the car, where transporting multiple beverages are typically temporarily stowed while transporting.

Accordingly, there is an established need for a multiple beverage device which solves at least one of the aforementioned problems. Further, there is an established need for a car multi beverage transporting device which can address providing an effective and economical way to transport multiple beverages in a car while minimizing spilling the beverages and mitigate causing damage to an interior of a car.

SUMMARY OF THE INVENTION

According to an aspect of the present invention, car multi beverage transporting devices are provided. These innovations include new, useful, and non-obvious systems which provide a user of the device to effectively transport multiple beverages in a car while minimizing spilling of the beverages.

In another aspect of the present invention, a multi beverage transporting device suitable for use in holding and transporting a plurality of beverages in a car to minimize spilling is provided. The device includes a multi beverage holding tray, wherein the multi beverage holding tray includes a plurality of beverage holder interfaces on a top surface of the multi beverage holding tray. The device also includes a plurality of beverage holders configured to connect with the multi beverage holding tray and designed to hold a plurality of beverages when connected to the multi beverage holding tray with the plurality of beverage holder interfaces on the top surface of the multi beverage holding tray.

The device further includes a seat belt attachment device configured to attach to a standard car seat belt. The device additionally includes a transporting handle apparatus configured to connect with the multi beverage holding tray and designed to be grasped with one hand and arranged to be connected to the multi beverage holding tray to allow transporting of the multi beverage transporting device and structured to engage with the standard car seat belt with the seat belt attachment device and to maintain the plurality of beverages within the plurality of beverage holders in a secure fashion mitigating spilling of liquid from the plurality of beverages when the multi beverage transporting device is positionable onto a standard car seat and when the standard seat belt with the seat belt attachment device is engaged with the multi beverage transporting device, is configured to minimize spilling.

In embodiments, the multi beverage transporting device can include a plurality of beverage holders which include telescoping sections, wherein the telescoping sections include collapsible, extendable, and lockable rings, wherein the collapsible, extendable, and lockable rings are arranged to securely maintain beverages within the beverage holders when the collapsible, extendable, and lockable rings are extended, and to allow the collapsible, extendable, and lockable rings to rest on the top surface of the multi beverage holding tray when the collapsible, extendable, and lockable rings are collapsed In embodiments, the device can also further include a transporting handle apparatus which includes an attachment/detachment mechanism designed to attach and detach the transporting handle device to and from the multi beverage holding tray.

In embodiments, the device can additionally include a transporting handle apparatus attachment/detachment mechanism which is designed to attach and detach the transporting handle apparatus to and from the multi beverage holding tray in a plurality of locations on the multi beverage holding tray.

In embodiments, the device includes a plurality of beverage holders which include insulation, wherein the insulation is configured to maintain hot beverages hot and cold beverages cold.

In embodiments, the device can also include magnets configured to place the multi beverage transporting device onto a standard car seat and securely carry the multi beverage transporting device while a car is in motion.

In embodiments, the device can additionally include a transporting handle apparatus which is configured to interface with the standard car seat belt and designed to position the multi beverage transporting device onto a standard car seat and securely carry the multi beverage transporting device while a car is in motion.

In embodiments, the device can include a transporting handle apparatus which includes a C-shaped portion configured to interface with the standard car seat belt and designed to position the multi beverage transporting device onto a standard car seat and securely carry the multi beverage transporting device while a car is in motion.

In embodiments, the device can also include a storage tray wherein the storage tray is housed within a body of the multi beverage holding tray.

In embodiments, the device can further include a plurality of beverage holders and where the transporting handle apparatus are configured to attach to the multi beverage holding tray and are designed to detach from the multi beverage holding tray In embodiments, the device can include surfaces wherein the multi beverage holding tray, the plurality of beverage holders, and the transporting handle apparatus include non-porous materials.

In embodiments, the device can additionally include non-porous materials which include anti-microbial surfaces.

These and other objects, features, and advantages of the present invention will become more readily apparent from the attached drawings and the detailed description of the preferred embodiments, which follow.

BRIEF DESCRIPTION OF THE DRAWINGS

The features and advantages of the present invention will be better understood when the Detailed Description of the Preferred Embodiments given below is considered in conjunction with the figures provided.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
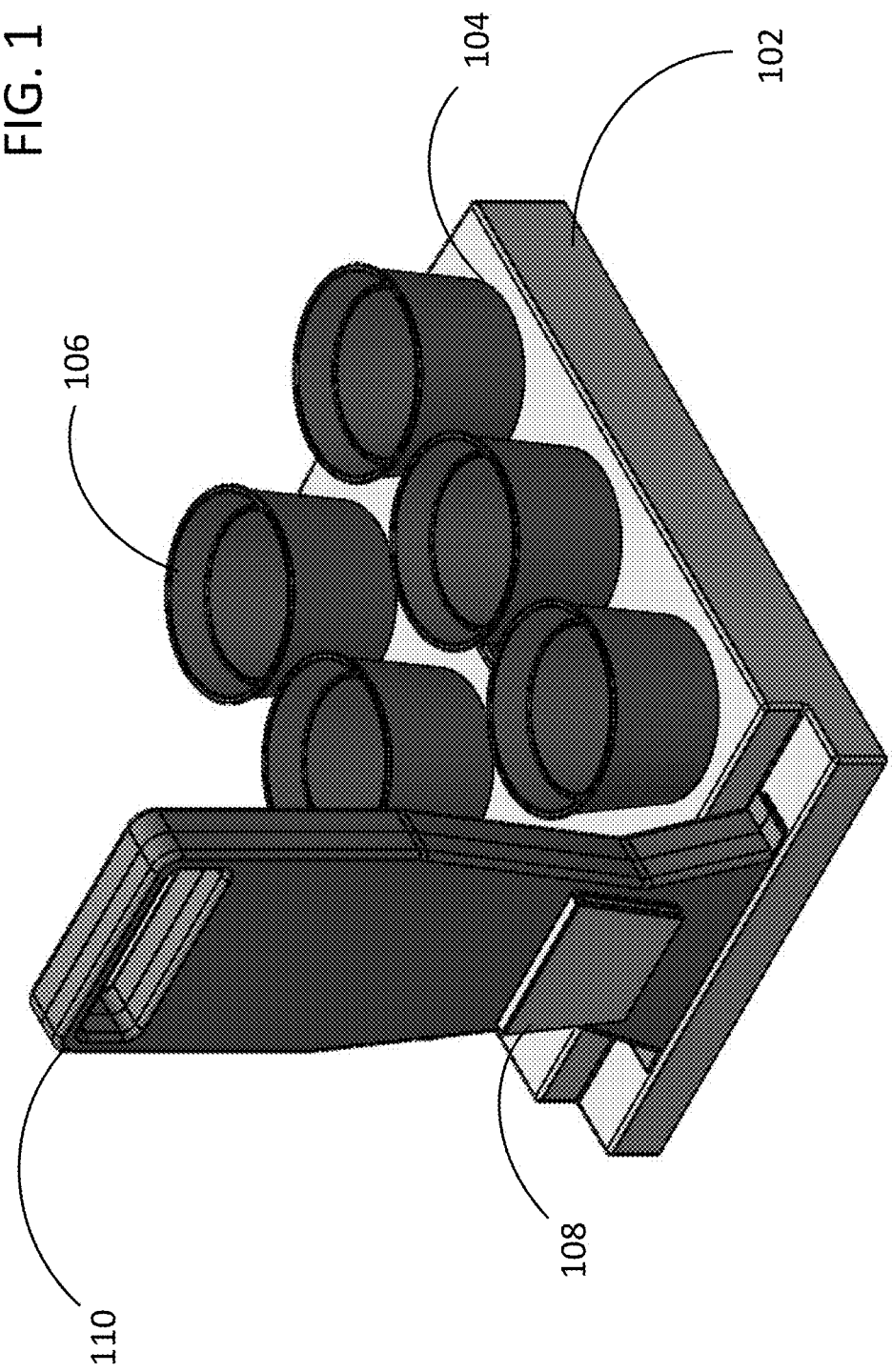
FIG. 1 is a top perspective view of a device in an embodiment of the present invention.

As seen in FIG. 1, a top perspective view of an embodiment of the device is displayed. The device can include a multi beverage holding tray 102. On a top surface of the holding tray 102 can include a plurality of beverage holder interfaces 104 wherein a plurality of beverage holders 106 can interface with and provide a compartment for stowing beverages while transporting the beverages in a car. The device can also include a seat belt attachment device 108. The seat belt attachment device 108 can be designed to be placed onto lap belt area of a standard car seat belt. The attachment device 108 can include items such as magnets 124 which can be aligned with other magnets 124 which can be structured to be placed on a transporting handle apparatus 110 such that when the transporting handle apparatus 110 is placed in close proximity to the attachment device 108, the items such as magnets 124 maintain the transporting handle apparatus in contact with the seat belt attachment device 108 and keeps the beverages in the multi beverage transporting from spilling. A shown in FIG. 1, the attachment device 108 can be placed onto a surface of the transporting handle apparatus 110 while not transporting beverages. During normal transportation evolutions, the attachment device 108 can best be utilized by being placed onto the lap belt area of a standard seat belt in preparation for loading the device with multiple beverages for transporting and then having the transporting handle apparatus 110 being held in place next to the attachment device 108 for stability of the beverages during transportation of the beverages.

Also as best seen in FIG. 1, is the position of the handle apparatus 110 is at the end of the device in preparation for placing the device onto the passenger seat of the car and being held in place with the attachment device 108.

Figure 2:
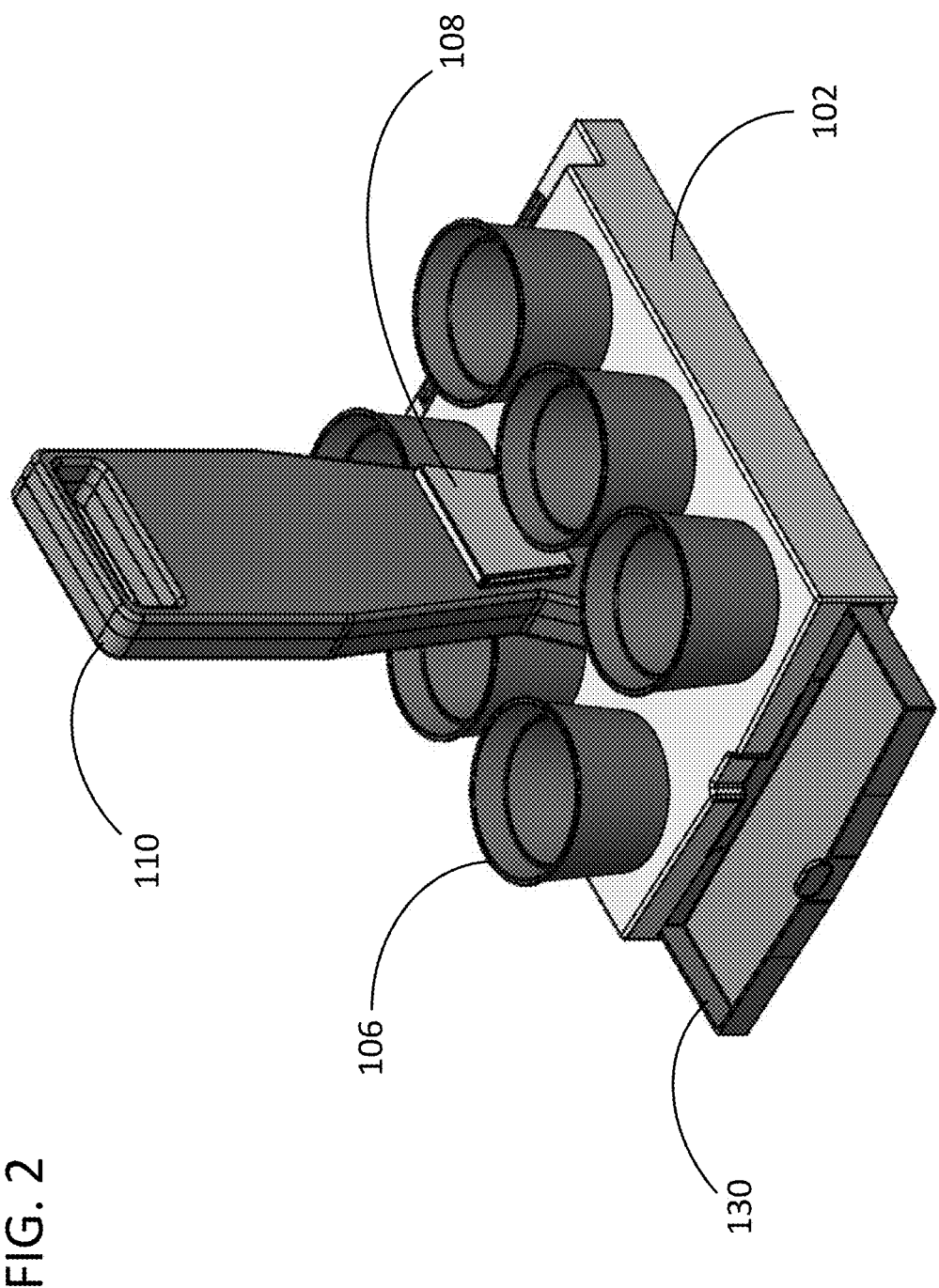
FIG. 2 is a top perspective view of a device in an embodiment of the present invention.

FIG. 2 is another top perspective view of the device. In this illustration, the handle apparatus 110 is shown being connected to the tray 102 in a hand carrying mode. As one would handle the device while hand carrying multiple beverages to and from a car. In FIG. 2, it can also be shown that in some embodiments, a storage tray 130, can be included. Also, as best seen in FIG. 2, the seat belt attachment device 108 can be stored onto the handle apparatus 110 as the user of the device is carrying the device outside of the car.

Figure 3:
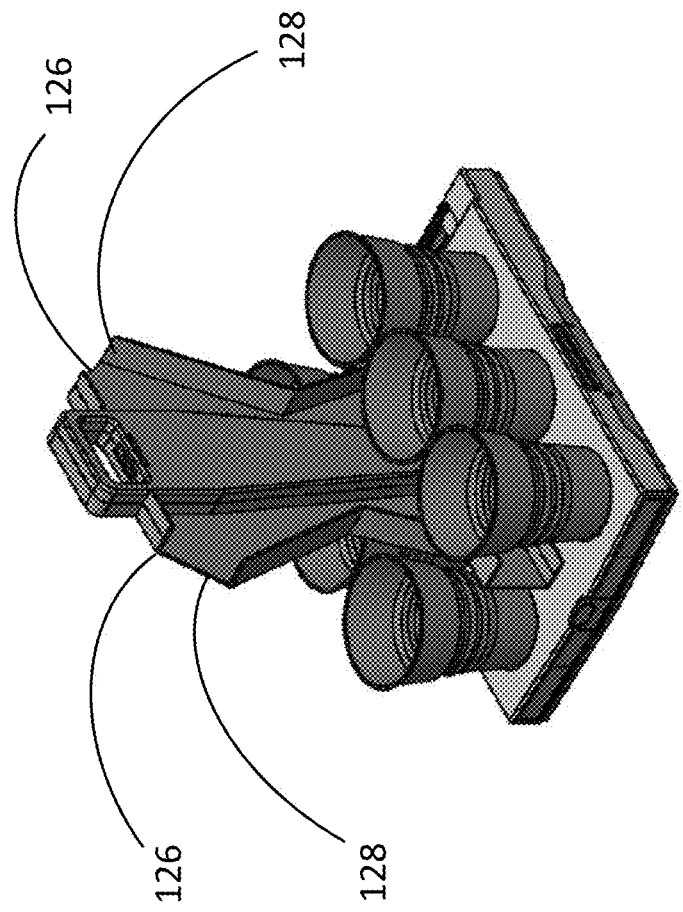
FIG. 3 is a top perspective view of a device in an embodiment of the present invention.

FIG. 3 displays embodiments of the present invention wherein the handle apparatus 110 can include shapes, configurations 126, and physical attributes including C-shaped portions 128 designed to allow the device to interface with a car seat belt in order to keep the device stable while the car is in operation and the device is stowed on top of a passenger car seat.

Figure 4B:
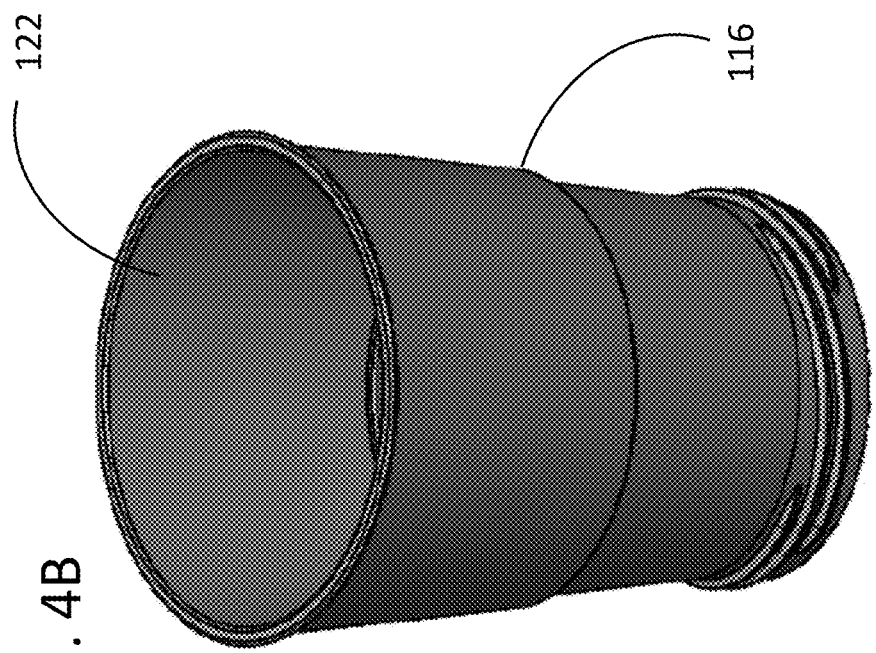
FIGS. 4A and 4B is an exploded view and a composite view of telescoping beverage holders in an embodiment of the present invention.
Figure 4A:
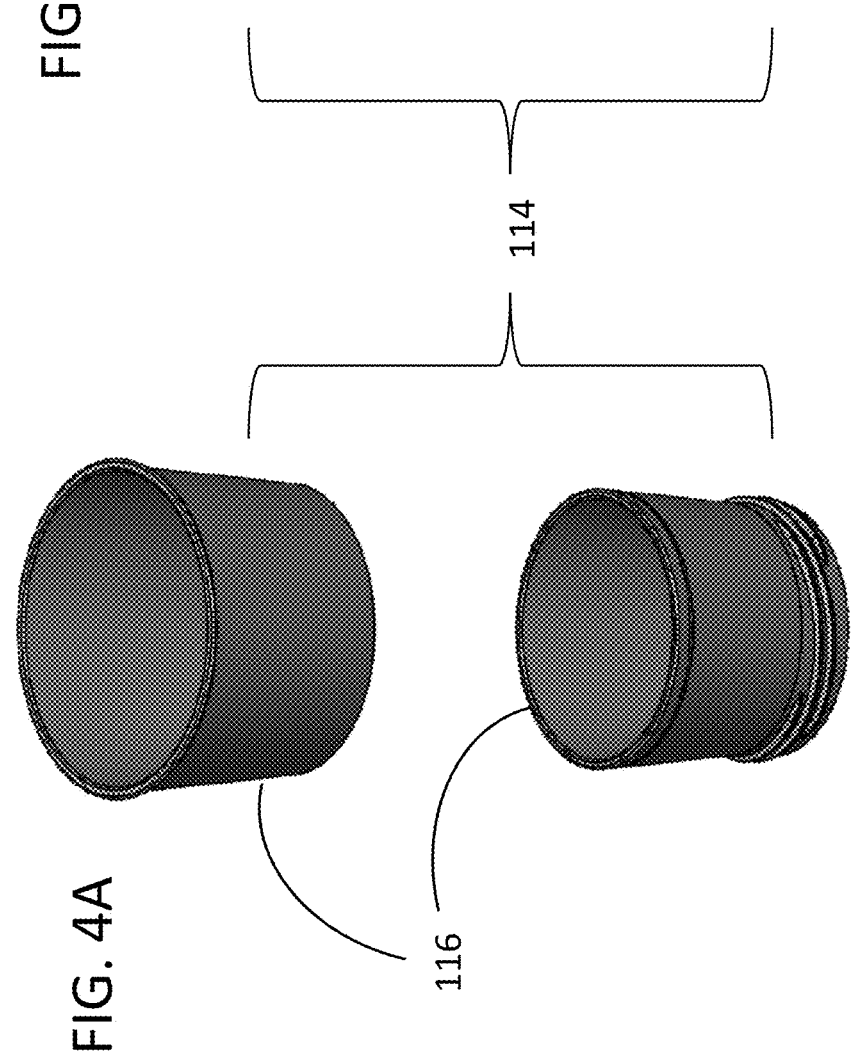

FIGS. 4A and 4B shows exploded and connected views of embodiments of the present invention wherein portions of beverage holders 106 can include telescoping sections 114, collapsable, extendable, and lockable rings 116 and insulation 122.

Figure 5:
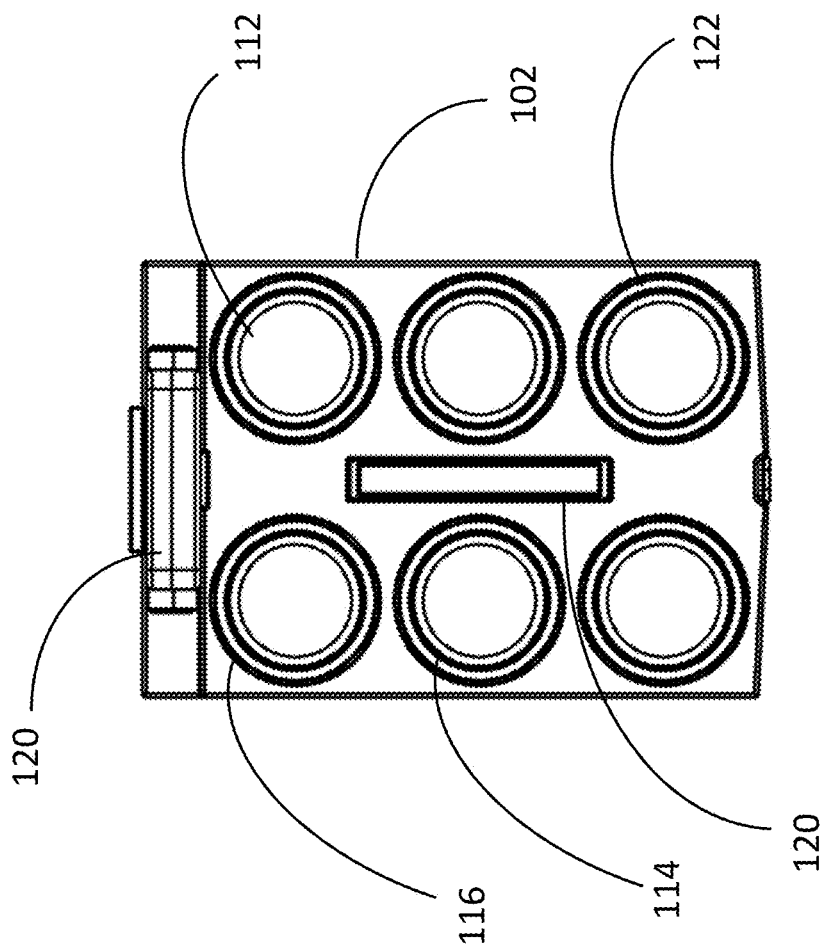
FIG. 5 is a top perspective view of a device in an embodiment of the present invention.

FIG. 5 shows a top view of an embodiment of the present invention wherein a plurality of locations 120 on the tray 102 are configured for the handle apparatus 110 to connect with the tray and allow hand carrying of the device as seen in FIG. 2 or arranged for placing onto the passenger car seat of a car for transportation as shown in FIG. 1. Additionally, in embodiments, the device can include a plurality of interfaces 104 on a top surface of the tray 102.

Figure 6:
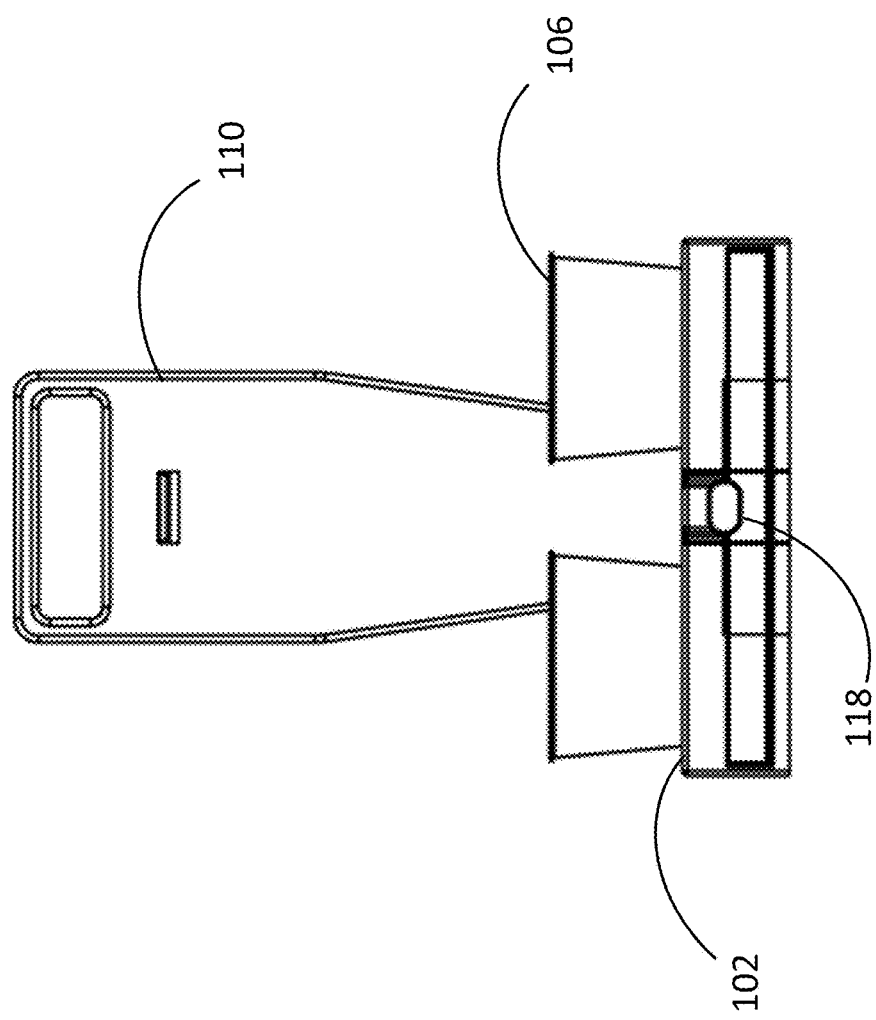
FIG. 6 is a front view of a device in an embodiment of the present invention.

FIG. 6 shows a front view wherein the device can include an apparatus handle 110 configured with an attachment/detachment mechanism 118 designed to attach and detach the transporting handle 110 from the multi beverage holding tray 102.

Figure 7:
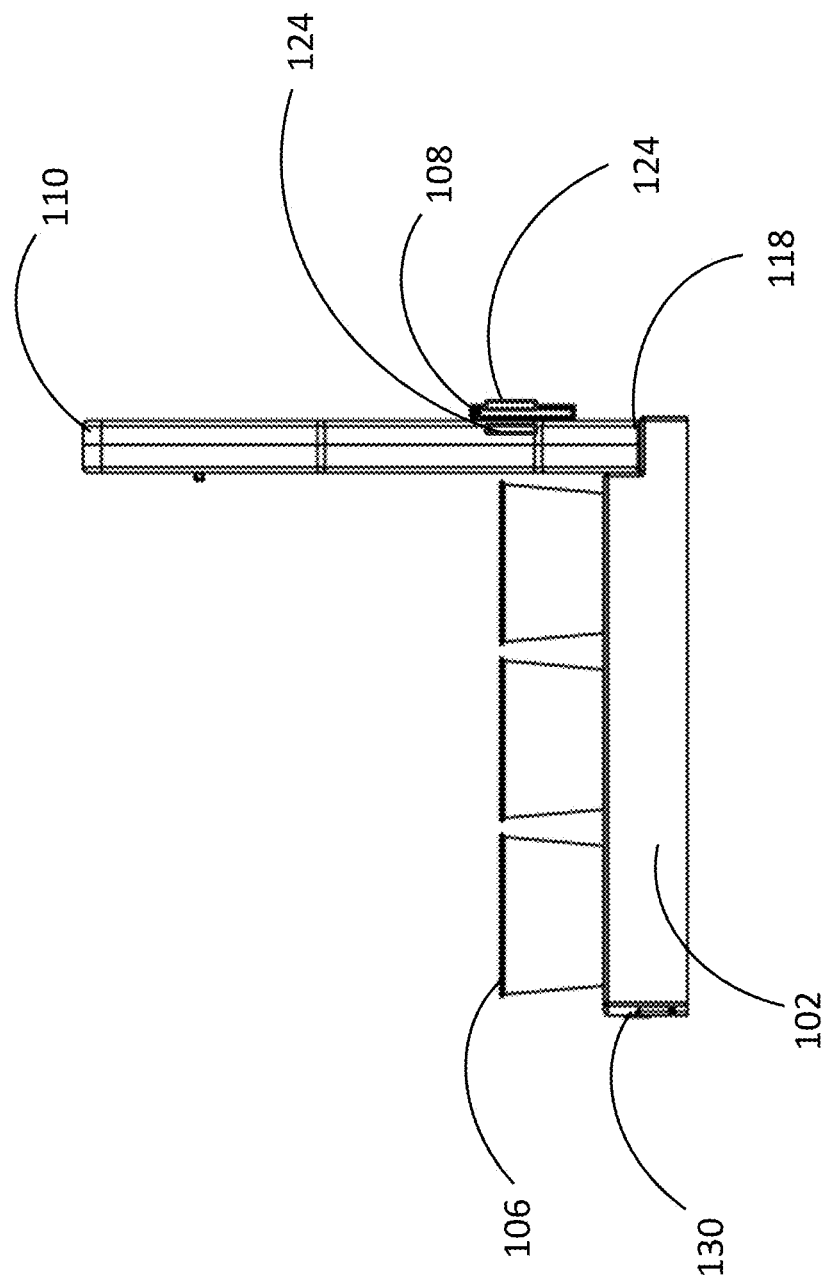
FIG. 7 is a side view of a device in an embodiment of the present invention.

FIG. 7 illustrates embodiments of the present invention wherein the attachment/detachment device 118 can attach the handle apparatus 110 to the tray 102. Also, as shown in FIG. 7 are embodiments wherein magnets 124 can be configured on the handle apparatus 110 and the seat belt attachment device 108 and configured to allow the surfaces of the seat belt attachment device 108 and the handle apparatus 110 to remain mated with one another and to hold the device in place onto the passenger car seat while the car is in operation and providing stability of the multi beverage transporting device while the car is moving thereby minimizing spilling of beverages.

Figure 8:
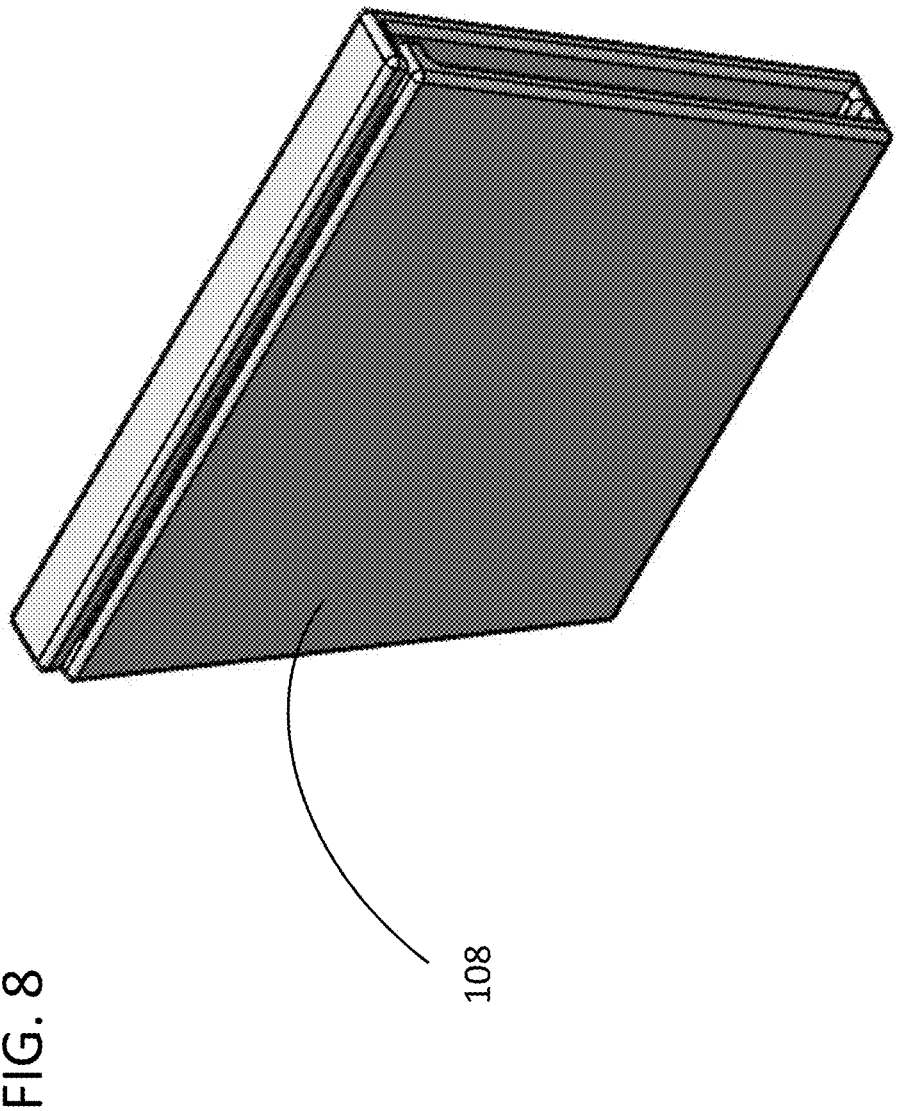
FIG. 8 is a perspective view of a seat belt attachment device in an embodiment of the present invention.

FIG. 8 displays an embodiment of the car seat attachment device 108. The attachment device 108 can be placed around the perimeter of a cross sectional area of a standard lap belt and/or seat belt. The ability to allow the attachment device 108 to remain connected around the seat belt can facilitate removing the beverage transporting device from the car, load the transporting device with beverages, return to the car with the device, and with the magnets 124 on the seat belt attachment device 108 and the magnets 124 on the handle apparatus 110 allow positive securing of the device onto the passenger car seat for ease of transporting the beverages while the car is in motion.

Figure 9:
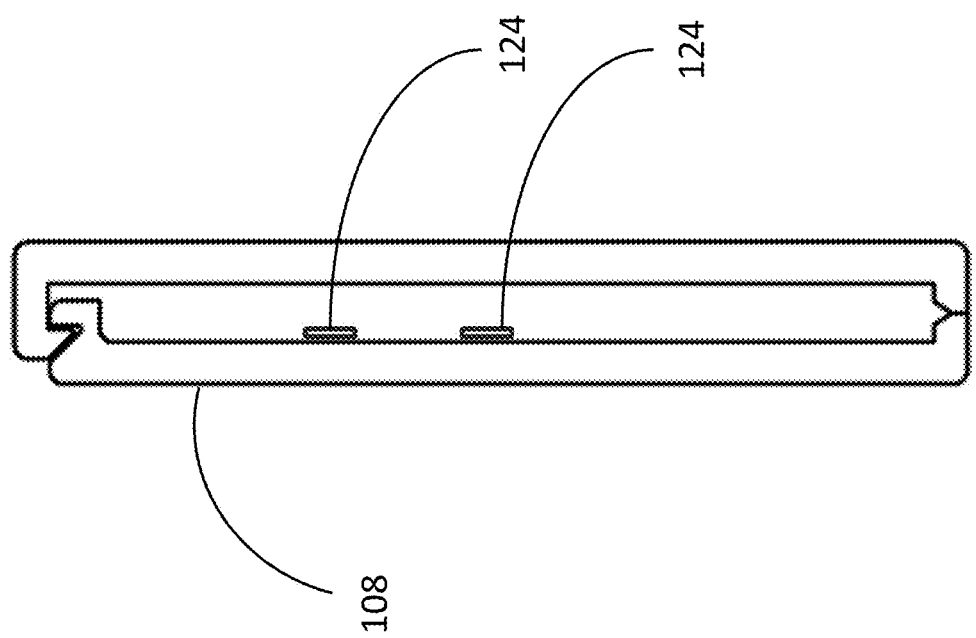
FIG. 9 is a side view of a seat belt attachment device in an embodiment of the present invention.

FIG. 9 shows a cross sectional view of a seat belt attachment device 108 with magnets 124 positionable about the device 108.

Figure 10:
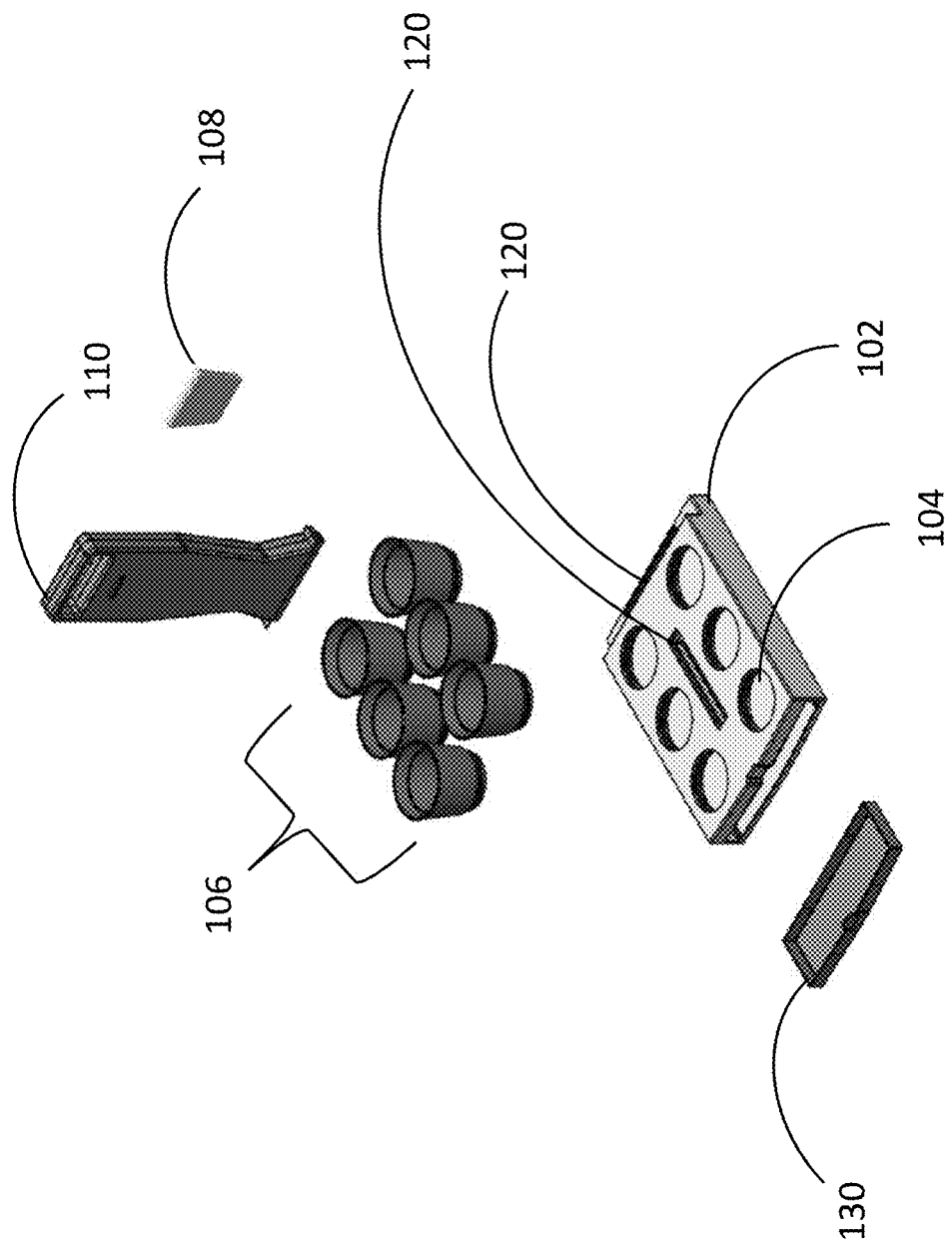
FIG. 10 is an exploded view of a device in an embodiment of the present invention.

FIG. 10 displays an exploded view of the components of the car multi beverage transporting device wherein the components can be designed to be removeable from one another and allow for easy cleaning of all components.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

The present invention has been described with reference to the preferred embodiments, it should be noted and understood that various modifications and variations can be crafted by those skilled in the art without departing from the scope and spirit of the invention. Accordingly, the foregoing disclosure should be interpreted as illustrative only and is not to be interpreted in a limiting sense. Further it is intended that any other embodiments of the present invention that result from any changes in application or method of use or operation, method of implementation which are not specified within the detailed written description or illustrations contained herein are considered within the scope of the present invention.

Insofar as the description above and the accompanying drawings disclose any additional subject matter that is not within the scope of the claims below, the inventions are not dedicated to the public and the right to file one or more applications to claim such additional inventions is reserved.

The present invention has been described with reference to the preferred embodiments, it should be noted and understood that various modifications and variations can be crafted by those skilled in the art without departing from the scope and spirit of the invention. Accordingly, the foregoing disclosure should be interpreted as illustrative only and is not to be interpreted in a limiting sense. Further it is intended that any other embodiments of the present invention that result from any changes in application or method of use or operation, method of manufacture, shape, size, or materials which are not specified within the detailed written description or illustrations contained herein are considered within the scope of the present invention.

What is claimed is:

1. A multi beverage transporting device suitable for use in holding and transporting a plurality of beverages in a car to minimize spilling, the device comprising:
   a multi beverage holding tray, wherein the multi beverage holding tray includes a plurality of beverage holder interfaces on a top surface of the multi beverage holding tray;
   a plurality of beverage holders configured to connect with the multi beverage holding tray and designed to hold a plurality of beverages when connected to the multi beverage holding tray with the plurality of beverage holder interfaces on the top surface of the multi beverage holding tray;
   a seat belt attachment device configured to attach to a standard car seat belt;
   a transporting handle apparatus configured to connect with the multi beverage holding tray and designed to be grasped with one hand and arranged to be connected to the multi beverage holding tray to allow transporting of the multi beverage transporting device and structured to engage with the standard car seat belt with the seat belt attachment device and to maintain the plurality of beverages within the plurality of beverage holders in a secure fashion mitigating spilling of liquid from the plurality of beverages when the multi beverage transporting device is positionable onto a standard car seat and when the standard seat belt with the seat belt attachment device is engaged with the multi beverage transporting device, is configured to minimize spilling.

2. The multi beverage transporting device of claim 1 wherein the plurality of beverage holder interfaces include a plurality of incorporated insertion regions on the top surface of the multi beverage holding tray wherein the plurality of beverage holders are structured to connect with the multi beverage holding tray with the incorporated insertion regions.

3. The multi beverage transporting device of claim 1 wherein the plurality of beverage holders include telescoping sections, wherein the telescoping sections include collapsible, extendable, and lockable rings, wherein the collapsible, extendable, and lockable rings are arranged to securely maintain beverages within the beverage holders when the collapsible, extendable, and lockable rings are extended, and to allow the collapsible, extendable, and lockable rings to rest on the top surface of the multi beverage holding tray when the collapsible, extendable, and lockable rings are collapsed.

4. The multi beverage transporting device of claim 1 wherein the transporting handle apparatus includes an attachment/detachment mechanism designed to attach and detach the transporting handle device to and from the multi beverage holding tray.

5. The multi beverage transporting device of claim 4 wherein the transporting handle apparatus attachment/detachment mechanism is designed to attach and detach the transporting handle apparatus to and from the multi beverage holding tray in a plurality of locations on the multi beverage holding tray.

6. The multi beverage transporting device of claim 1 wherein the plurality of beverage holders include insulation, wherein the insulation is configured to maintain hot beverages hot and cold beverages cold.

7. The multi beverage transporting device of claim 1 comprising magnets configured to place the multi beverage transporting device onto a standard car seat and securely carry the multi beverage transporting device while a car is in motion.

8. The multi beverage transporting device of claim 1 wherein the transporting handle apparatus is configured to interface with the standard car seat belt and designed to position the multi beverage transporting device onto a standard car seat and securely carry the multi beverage transporting device while a car is in motion.

9. The multi beverage transporting device of claim 1 wherein the transporting handle apparatus includes a C-shaped portion configured to interface with the standard car seat belt and designed to position the multi beverage transporting device onto a standard car seat and securely carry the multi beverage transporting device while a car is in motion.

10. The multi beverage transporting device of claim 1 comprising a storage tray wherein the storage tray is housed within a body of the multi beverage holding tray.

11. The multi beverage transporting device of claim 1 wherein the plurality of beverage holders and the transporting handle apparatus are configured to attach to the multi beverage holding tray and are designed to detach from the multi beverage holding tray.

12. The multi beverage transporting device of claim 1 wherein the multi beverage holding tray, the plurality of beverage holders, and the transporting handle apparatus include non-porous materials.

13. The multi beverage transporting device of claim 12 wherein the non-porous materials include anti-microbial surfaces.

* * * * *